United States Patent
Holzberger et al.

(10) Patent No.: US 12,103,346 B2
(45) Date of Patent: Oct. 1, 2024

(54) DEVICE FOR ADJUSTING THE HEIGHT OF A VEHICLE BODY

(71) Applicant: Schaeffler Technologies AG & Co. KG, Herzogenaurach (DE)

(72) Inventors: Markus Holzberger, Emskirchen (DE); Wilfried Breton, Altdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/053,475

(22) PCT Filed: Jan. 28, 2019

(86) PCT No.: PCT/DE2019/100082
§ 371 (c)(1),
(2) Date: Nov. 6, 2020

(87) PCT Pub. No.: WO2019/219109
PCT Pub. Date: Nov. 21, 2019

(65) Prior Publication Data
US 2024/0246382 A1    Jul. 25, 2024

(30) Foreign Application Priority Data
May 16, 2018 (DE) ............ 10 2018 111 739.6

(51) Int. Cl.
*B60G 17/015*    (2006.01)
*B60G 17/02*    (2006.01)

(52) U.S. Cl.
CPC ....... *B60G 17/0157* (2013.01); *B60G 17/021* (2013.01); *B60G 2202/12* (2013.01); *B60G 2202/42* (2013.01); *B60G 2202/442* (2013.01); *B60G 2204/124* (2013.01); *B60G 2204/419* (2013.01); *B60G 2500/30* (2013.01)

(58) Field of Classification Search
CPC .................. B60G 17/0157; B60G 2202/42
See application file for complete search history.

(56) References Cited

U.S. PATENT DOCUMENTS

| | | | |
|---|---|---|---|
| 2009/0146385 A1 | 6/2009 | Michel | |
| 2017/0267045 A1* | 9/2017 | Ikeda | ............... B62K 25/08 |

FOREIGN PATENT DOCUMENTS

| | | | | |
|---|---|---|---|---|
| CA | 2754222 A1 * | 3/2012 | ......... | B60G 17/0157 |
| CN | 101896369 A | 11/2010 | | |
| DE | 102004014336 B3 | 6/2005 | | |
| DE | 102005001744 B3 | 7/2006 | | |
| DE | 102005001745 B3 | 7/2006 | | |
| DE | 102007060422 A1 * | 6/2009 | .......... | B60G 15/068 |
| DE | 102008005294 B3 | 6/2009 | | |
| DE | 102008023891 A1 | 11/2009 | | |

(Continued)

*Primary Examiner* — Nicole T Verley

(57) ABSTRACT

A device for adjusting the height of a vehicle body includes a rotationally driven axially non-displaceable threaded spindle and a threaded nut, axially displaceable along the threaded spindle. A spring plate is arranged on the threaded nut for axially supporting a spring element. The threaded spindle is drivable by an actuator which is arranged at least partially within the threaded spindle. An axially displaceable additional nut is arranged axially adjacent to the threaded nut along the threaded spindle to absorb a pulse and to introduce it into the housing via the threaded spindle.

13 Claims, 1 Drawing Sheet

(56) References Cited

FOREIGN PATENT DOCUMENTS

| | | | | |
|---|---|---|---|---|
| DE | 102010021536 A1 | 11/2011 | | |
| DE | 102011003485 A1 | 8/2012 | | |
| DE | 102013222648 A1 * | 5/2015 | ............ | B60G 15/02 |
| DE | 102016217623 A1 | 3/2018 | | |
| DE | 102017120589 A1 * | 10/2018 | | |
| EP | 1970228 B1 | 4/2010 | | |
| JP | 2001088528 A | 4/2001 | | |
| JP | 2001301436 A | 10/2001 | | |
| JP | 2008222218 A | 9/2008 | | |
| JP | 2010179728 A | 8/2010 | | |
| JP | 2016530154 A | 9/2016 | | |
| KR | 20190104814 A * | 9/2019 | | |
| WO | WO-2009133064 A1 * | 11/2009 | ............ | B60G 7/006 |

* cited by examiner

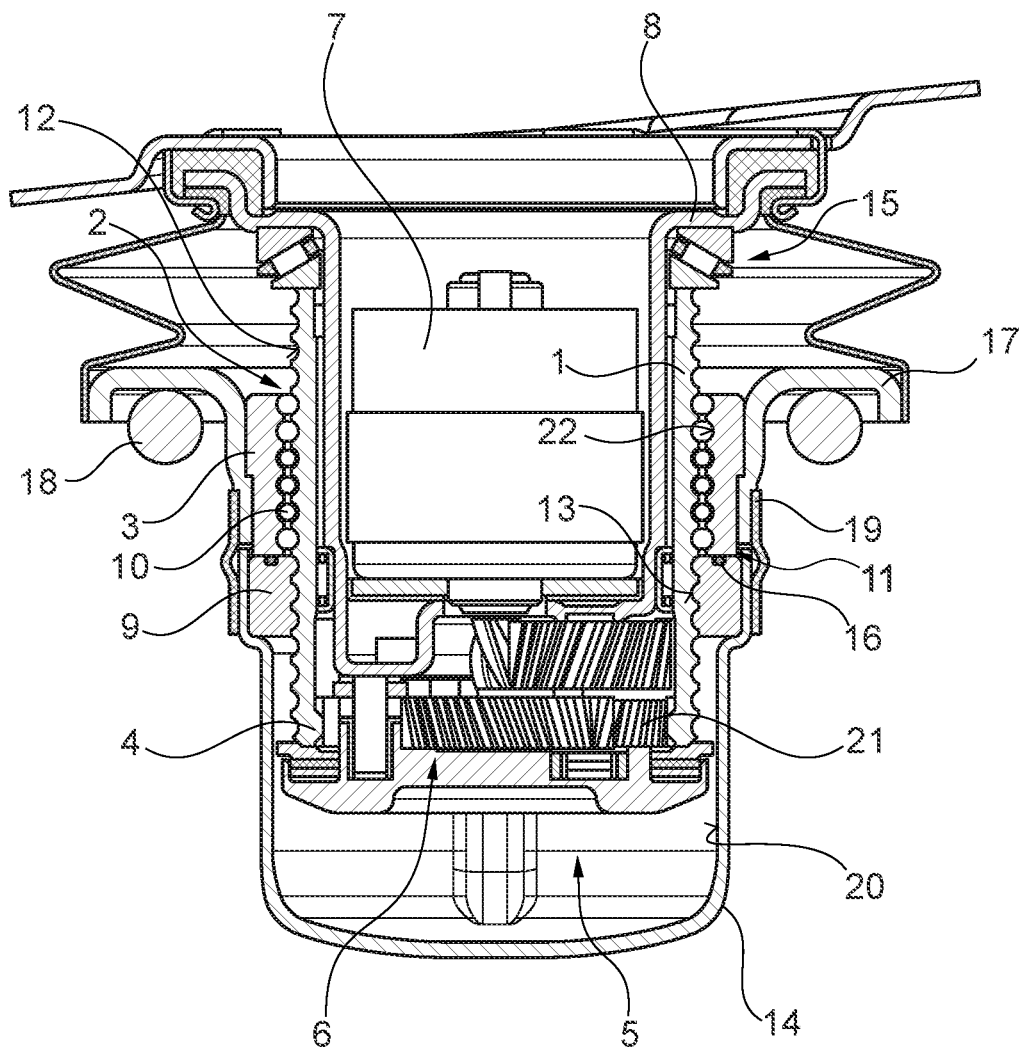

DEVICE FOR ADJUSTING THE HEIGHT OF A VEHICLE BODY

CROSS-REFERENCE TO RELATED APPLICATIONS

This application is the U.S. National Phase of PCT Appln. No. PCT/DE2019/100082 filed Jan. 29, 2019, which claims priority to DE 10 2018 111 739.6 filed May 16, 2018, the entire disclosures of which are incorporated by reference herein.

TECHNICAL FIELD

The disclosure relates to a device for adjusting the height of a vehicle body. Generic-type devices for adjusting the height of vehicle bodies are provided for increasing the ground clearance of vehicles or lowering them in the struts of the vehicles on flat roadways.

BACKGROUND

EP 1 970 228 Bi discloses a height adjustment device for vehicles, which is arranged between a height-adjustable spring plate of a suspension spring of a wheel suspension of the vehicle and the vehicle body. A drive motor interacts via a gear stage with a rotatably mounted adjusting sleeve for height adjustment of the spring plate. The gear stage connected between the drive motor and the adjusting sleeve is arranged inside the adjusting sleeve and the adjusting sleeve is part of a ball screw drive, the ball nut of which is arranged radially outside the adjusting sleeve and inside the suspension spring.

SUMMARY

It is desirable to further develop a device for adjusting the height of a vehicle body in such a way that the service life of a ball screw drive is improved.

A device for adjusting the height of a vehicle body comprises a rotationally driven axially non-displaceable threaded spindle and a threaded nut, axially displaceable along the threaded spindle. A spring plate is arranged on the threaded nut for axially supporting a spring element. The threaded spindle is drivable by an actuator. The actuator is at least partially arranged within the threaded spindle. An axially displaceable additional nut is arranged to be axially adjacent to the threaded nut to absorb a pulse and to introduce same into the housing via the threaded spindle.

The device is intended to carry out a lifting movement by axially shifting the threaded nut with respect to the threaded spindle and thereby to carry and raise or lower the vehicle weight resting on a vehicle axle. This changes the height of the vehicle and the vehicle can be brought to a desired target height. A rotary drive of the axially non-displaceable, rotationally drivable threaded spindle leads to a longitudinal shift of the threaded nut and the additional nut relative to the threaded spindle. As a result, the threaded nut and the additional nut shift longitudinally. The additional nut is preferably carried load-free during the adjustment. The shift of the additional nut, which takes place analogously to that of the threaded nut, results in a simultaneous adjustment of an end stop of the device.

An end stop is a structural limitation of the compression travel of the coil spring. The end stop can be realized in particular by additional components which are arranged between the chassis and the device for adjusting the height.

An unadjustable end stop would result in different compression travels and thus different points in time at which the pulse is introduced into the device, depending on the actual vehicle height set. In other words, an unshiftable end stop would result in a change in the spring characteristic of the coil spring, which affects the driving behavior of the vehicle depending on the height of the vehicle. Thus, lifting the vehicle would result in an extension of the compression travel up to the end stop, the spring element being highly compressible depending on the stroke. This would result in a significant increase in the loads on the entire system of the device and would result in premature failure of the spring. Lowering the vehicle in the case of an unshiftable end stop would in turn reduce the compression travel to the end stop, with a pulse acting on the system of the device after a shorter compression travel depending on the stroke. This would adversely change the driving behavior of the vehicle due to the small compression travel and thus impair driving comfort.

The end stop is consequently also adjusted by the simultaneous adjustment of the additional nut with the threaded nut. In other words, the adjustment of the end stop adjusts or readjusts the compression travel of the spring element to the same extent as a function of the stroke. The spring characteristic of the spring element is readjusted in every actual height position of the vehicle and thus kept constant.

A pulse acting on the end stop is generated, for example, when the vehicle passes an obstacle or potholes, the suspension spring or spring element compresses, and the undercarriage comes into contact with the end stop so that the pulse is introduced into the additional nut. In other words, the pulse is an additional force acting on the device, namely what is termed an end stop force, which is introduced via the end stop into the additional nut and, in addition to the regular spring force of the coil spring, is also absorbed by the device and introduced into the housing or body of the vehicle.

In other words, the pulse or the end stop force is introduced into the threaded spindle via the additional nut and the spring force is introduced into the threaded spindle via the spring plate and the threaded nut. There are therefore two load paths in the device for adjusting the height. A first load path for the spring forces that occur regularly during operation of the vehicle and a second load path for the additional end stop forces that occur.

A bearing element is preferably arranged axially between the threaded spindle and the housing to rotatably support the threaded spindle. The bearing element is designed in particular to introduce radial and axial forces into the housing. The bearing element is preferably designed as an axial spherical roller bearing and is designed such that both the spring forces and the end stop forces can be absorbed. It is essential that the bearing element can absorb both axial forces and radial forces.

The spring forces resulting from the chassis spring are conducted into the ball nut of the ball screw drive via the spring plate, which is firmly connected to the threaded nut. From there, the spring forces are guided into the threaded spindle via rolling elements spatially arranged between the threaded nut and the threaded spindle, and finally into the housing via the bearing element. The threaded nut and the rolling elements only absorb a maximum of the load from the chassis spring, the pulses acting on the additional nut being introduced into the threaded spindle. As a result, even high loads have no negative impact on the service life of the ball screw drive. The ball screw drive can be made compact and inexpensive, the ball screw drive absorbing pulses which are more stressful, but occur less frequently, via additional components, namely via the additional nut and other components which are operatively connected to the additional nut.

Preferably, the additional nut has, on the inner lateral surface thereof, an internal thread complementary to an external thread of the threaded spindle, wherein the additional nut is connected, in a rotationally fixed manner on the outer lateral surface thereof, to a cap element which conducts the pulse into the additional nut. If the pulse acts on the additional nut via the cap element or if the force acting on the additional nut comes to rest, the additional nut shifts axially in the direction of the threaded nut and the internal thread thereof axially comes into contact with the external thread of the threaded spindle.

Due to the larger force transmission surface available between the additional nut and the threaded spindle compared to the ball screw drive, larger loads can be introduced from the pulses into the housing, and the rolling elements of the ball screw drive are thus protected or not additionally loaded. In other words, the additional nut comes into engagement with the threaded spindle in the load direction, as a result of which the end stop forces are supported in the housing via the threaded spindle and the bearing element. The additional nut is self-locking and the system is clamped in the respective position.

The cap element is preferably designed in the shape of a dome, so that the gear unit and/or the drive motor can be accommodated spatially between the ball screw drive and the cap element, and the threaded spindle is also guided in a protected manner. The cap element is preferably designed to receive a spring stop or an additional spring. In other words, the cap element is designed as an end stop to be able to receive and transmit the pulses.

The external thread of the threaded spindle and the internal thread of the additional nut are preferably designed to have play relative to one another. In other words, an axial and radial play is thus formed between the threaded spindle and the additional nut, which prevents jamming between the additional nut and the threaded spindle, in particular at the beginning of an adjustment process.

The axial play between the external thread of the threaded spindle and the internal thread of the additional nut is preferably made smaller than the axial play between the threaded nut and the additional nut arranged axially adjacent thereto. In other words, when the additional nut is axially shifted, the external thread of the threaded spindle and the internal thread of the additional nut come into load engagement before the additional nut can come into contact with the threaded nut. This ensures that the two load paths are separated at all times and for every load that occurs, with the load being introduced from the coil spring via the threaded nut and the rolling elements introduced into the threaded spindle and the end stop forces from the pulses acting on the cap element via the additional nut into the threaded spindle. As a result, all loads acting on the device are brought together in the threaded spindle and supported in the housing.

The actuator with which the threaded spindle can be driven preferably comprises a gear unit and a drive motor, the drive motor being designed, for example, as an electric motor. A locking mechanism is preferably formed in the gear unit, which is provided to lock a rotation of one of the gearwheels in the gear unit to prevent an unwanted rotation of the threaded spindle and the associated axial shift of the threaded nut relative to the threaded spindle.

Furthermore, a toothing is preferably formed on an inner circumferential surface of the threaded spindle, via which the actuator drives the threaded spindle. The toothing meshes with one or more gears of the gear unit. The teeth are preferably designed as helical teeth, but can also be designed as straight teeth.

An elastic element may be arranged axially between the threaded nut and the additional nut. This serves to avoid rattling or hitting noises caused by abutting components. The elastic element is preferably designed as an O-ring and received in corresponding grooves on the threaded and/or additional nut to secure the position.

The cap element and the spring plate may be at least partially enclosed by a sealing element. This protects the interior of the device from external influences such as dirt and moisture. The sealing element is preferably designed as a collar, so that an axial displacement between the threaded nut and the additional nut is possible without impairing the sealing effect. Alternatively, a sealing element may be arranged axially between the cap element and the spring plate, with a sufficient sealing effect also being realized here even in the event of an axial shift between the threaded nut and the additional nut.

At least one groove may be formed on the cap element to secure the threaded nut and the additional nut against rotation. In particular, the respective groove interacts with an essentially form-fitting nose arranged thereon or in an axial configuration.

In a vehicle with four wheels, a height adjusting device may be provided in each spring strut of the vehicle. Alternatively, in a vehicle with four wheels, a height adjusting device may be provided at least on the two suspension struts of one axle. Furthermore, the actuator is preferably fastened between the wheel carrier and the lower spring plate or between the vehicle body and the upper spring plate.

BRIEF DESCRIPTION OF THE DRAWINGS

Further measures to improve the height adjusting device are shown in more detail below together with the description of a preferred exemplary embodiment based on the single FIGURE. The single FIGURE shows a schematic sectional view of a height adjusting device of a vehicle body.

DETAILED DESCRIPTION

According to the single FIGURE, a device for adjusting the height of a vehicle body comprises a ball screw drive 2 with a rotationally driven axially non-displaceable threaded spindle 1 and a threaded nut 3 axially displaceable along the threaded spindle 1. The threaded nut 3 is arranged radially outside the threaded spindle 1. A spring plate 17 is arranged on the threaded nut 3, against which a spring element 18 is axially supported. The spring plate 17 has a radial leg for receiving the spring element 18 and an axial leg, which is arranged radially outside the threaded nut 3 and is connected to this threaded nut 3 in a rotationally fixed manner.

The threaded spindle 1 is designed as a tube element or sleeve element and has an external thread 12 or an external raceway on the outer peripheral surface thereof. The threaded nut 3 has an internal thread or an inner raceway 22 on the inner circumferential surface thereof, a large number of rolling elements 10 rolling between the outer raceway of the threaded spindle 1 and the inner raceway of the threaded nut 3. A spring force which acts on the device via the spring element 18 is first introduced into the spring plate 17 and the threaded nut 3 and is passed on via the rolling elements 10 into the threaded spindle 1. The spring force is supported in the housing 8 via a bearing element 15 arranged axially between the threaded spindle 1 and the housing 8. The bearing element 15 is designed as an axial bearing to rotatably support the threaded spindle 1 with respect to the housing and to transmit the forces axially.

The threaded spindle 1 partially receives an actuator 5, which comprises a drive motor 7 designed as an electric motor and a gear unit 6. The gear unit 6 interacts with the threaded spindle 1, the threaded spindle 1 being drivable by the actuator 5 to axially shift the threaded nut 3 with respect to the threaded spindle 1. The gear unit 6 has a locking mechanism (not further explained and illustrated here) to block a rotary movement of the threaded spindle 1. To drive the threaded spindle 1, a toothing 4 is formed on the inner circumferential surface thereof, which meshes with a gear wheel 21 of the gear unit 6.

An axially displaceable additional nut 9 is also arranged axially adjacent to the threaded nut 3 together with the threaded nut 3 along the threaded spindle 1. When the threaded spindle 1 is driven by the actuator 5, the additional nut 9 is shifted along the threaded spindle 1 together with the threaded nut 3 in a load-free manner.

The additional nut 9 is provided to receive a pulse and to introduce it into the housing 8 via the threaded spindle 1. The additional nut 9 is non-rotatably connected to the cap element 14 on the outer circumferential surface thereof, the cap element 14 being designed to accommodate a spring stop or an additional spring (not shown here). The pulse is introduced into the cap element 14 or into the additional nut 9 via this spring stop or the additional spring. In the present case, the cap element 14 has a dome shape.

The additional nut 9 has on the inner circumferential surface thereof an internal thread 13 which is complementary to the external thread 12 of the threaded spindle 1, the external thread 12 and the internal thread 13 being designed to have play relative to one another. The play between the external thread 12 and the internal thread 13 prevents jamming between the additional nut 9 and the threaded spindle 1.

The pulse acting on the additional nut 9 is generated, for example, by driving over an obstacle, this impact force being greater than the spring force acting on the spring plate 17 or the threaded nut 3. If the pulse acts on the additional nut 9, it shifts by the axial dimension of the axial play between the external thread 12 of the threaded spindle 1 and the internal thread 13 of the additional nut 9, the additional nut 9 coming into contact with the threaded spindle 1.

The threaded nut 3 and the additional nut 9 are arranged axially spaced from one another, the axial distance being greater than the aforementioned axial play between the additional nut 9 and the threaded spindle 1. Furthermore, an elastic element 16 is arranged axially between the threaded nut 3 and the additional nut 9 to avoid rattling or striking noises due to abutting components. The elastic element is designed as an O-ring in the present case, and is partially received in corresponding opposite grooves on the end face of the threaded or additional nut to secure the radial position of the O-ring.

Because the additional nut 9 picks up the pulse and directs it directly into the threaded spindle 1, a second load path is generated, the ball screw drive 2 absorbing only the loads acting from the spring element 18. Thus, the ball screw drive 2 and in particular the threaded nut 3 and the rolling elements 10 are protected, whereby the service life of the ball screw drive 2 is increased.

The cap element 14 and the spring plate 17 are at least partially enclosed by a sealing element 19 to protect the interior of the device against dirt and/or moisture. In addition, a groove 11 is formed on the cap element 14 to prevent the threaded nut 3 and the additional nut 9 from rotating.

LIST OF REFERENCE SYMBOLS

1 Threaded spindle
2 Ball screw drive
3 Threaded nut
4 Tooth system
5 Actuator
6 Gear unit
7 Drive motor
8 Housing
9 Additional nut
10 Rolling elements
11 Groove
12 External threads
13 Inner peripheral surface
14 Cap element
15 Bearing element
16 Elastic element
17 Spring plate
18 Spring element
19 Sealing element
20 Inner peripheral surface
21 Gear wheel
22 Inner raceway

The invention claimed is:

1. A device for adjusting a height of a vehicle body, comprising a rotationally driven threaded spindle, a threaded nut axially displaceable along the threaded spindle, a spring plate arranged on the threaded nut for axially supporting a spring element, the threaded spindle being drivable by an actuator, the actuator being arranged at least partially within the threaded spindle, wherein an additional nut, axially displaceable along the threaded spindles, is arranged to be axially adjacent to the threaded nut to receive a pulse and to introduce the pulse into a housing via the threaded spindle.

2. The device according to claim 1,
wherein the additional nut comprises, on an inner lateral surface thereof, an internal thread complementary to an external thread of the threaded spindle, wherein the additional nut is connected, in a rotationally fixed manner, to a cap element on an outer lateral surface thereof, which leads the pulse into the additional nut.

3. The device according to claim 2,
wherein the external thread of the threaded spindle and the internal thread of the additional nut are designed to have play relative to one another.

4. The device according to claim 2, wherein
the cap element and the spring plate are at least partially enclosed by a sealing element.

5. The device according to claim 2, wherein
at least one groove is formed on the cap element to secure the threaded nut and the additional nut against rotation.

6. The device according to claim 2, wherein
the cap element is designed to receive a spring stop or an additional spring.

7. The device according to claim 1, further comprising
a bearing element arranged axially between the threaded spindle and the housing to rotatably support the threaded spindle.

8. The device according to claim 1, further comprising
an elastic element arranged axially between the threaded nut and the additional nut.

9. The device according to claim 1, wherein
a toothing is formed on an inner lateral surface of the threaded spindle, via which the actuator drives the threaded spindle.

10. A device for adjusting a height of a vehicle body, comprising:
a housing;
a threaded spindle, supported for rotation with respect to the housing;
a first threaded nut configured to move axially along the threaded spindle in response to rotation of the threaded spindle;
a spring plate arranged on the first threaded nut for axially supporting a spring element;
a second threaded nut axially spaced apart from the first threaded nut and configured to move axially along the threaded spindle in response to rotation of the threaded spindle;
an end-stop arranged on the second threaded nut and configured to receive a pulse and to transmit the pulse to the housing, bypassing the first threaded nut.

11. The device according to claim 10, further comprising an actuator configured to rotate the threaded spindle, the actuator being arranged at least partially within the threaded spindle.

12. The device according to claim 10, wherein there is play between the threaded spindle and the second threaded nut.

13. The device according to claim 10, further comprising an elastic element arranged axially between the first threaded nut and the second threaded nut.

\* \* \* \* \*